(12) United States Patent
Kojima et al.

(10) Patent No.: US 8,339,097 B2
(45) Date of Patent: Dec. 25, 2012

(54) NON-CONTACT POWER TRANSFER APPARATUS

(75) Inventors: Hideki Kojima, Kawagoe (JP); Hiroshi Furuya, Hidaka (JP)

(73) Assignee: Toko, Inc., Tokyo-To (JP)

( * ) Notice: Subject to any disclaimer, the term of this patent is extended or adjusted under 35 U.S.C. 154(b) by 502 days.

(21) Appl. No.: 12/589,988

(22) Filed: Nov. 2, 2009

(65) Prior Publication Data

US 2010/0123430 A1    May 20, 2010

(30) Foreign Application Priority Data

Nov. 14, 2008   (JP) .................................. 2008-291889

(51) Int. Cl.
*H02J 7/00*   (2006.01)
(52) U.S. Cl. .......................................... 320/108; 32/106
(58) Field of Classification Search .................. 320/106, 320/108
See application file for complete search history.

(56) References Cited

U.S. PATENT DOCUMENTS

| | | | | |
|---|---|---|---|---|
| 7,605,496 B2* | 10/2009 | Stevens et al. | ................... | 307/17 |
| 8,039,995 B2* | 10/2011 | Stevens et al. | ................. | 307/104 |
| 8,188,854 B2* | 5/2012 | Yamashita | ..................... | 340/538 |
| 2007/0228833 A1* | 10/2007 | Stevens et al. | ................... | 307/45 |
| 2008/0164840 A1* | 7/2008 | Kato et al. | ..................... | 320/108 |
| 2010/0013432 A1* | 1/2010 | Toya et al. | ..................... | 320/108 |
| 2010/0315039 A1* | 12/2010 | Terao et al. | .................... | 320/108 |
| 2012/0146576 A1* | 6/2012 | Partovi | ......................... | 320/108 |
| 2012/0146580 A1* | 6/2012 | Kitamura | ..................... | 320/108 |

FOREIGN PATENT DOCUMENTS

| | | |
|---|---|---|
| JP | 06-311658 | 4/1994 |
| JP | 2000-037047 | 2/2000 |

* cited by examiner

*Primary Examiner* — Richard V Muralidar
(74) *Attorney, Agent, or Firm* — Renner, Kenner, Greive, Bobak, Taylor & Weber

(57) ABSTRACT

A non-contact power transfer apparatus includes a power transmission unit including a power transmission coil, a power transmission circuit, a current detection circuit, and a unit detection means and a first microcomputer with a control circuit for controlling each of the circuits. The non-contact power transfer apparatus also includes a power reception unit having a power reception coil, a rectification smoothing circuit, a series regulator, a charge battery unit with a rechargeable battery, a switching element for pulse-charging and a second microcomputer with a control circuit for controlling the series regulator and the switching element. As such, the power reception unit receives power via the power reception coil, while the rectification smoothing circuit and series regulator generate a set voltage. The set voltage is used to start the second microcomputer to apply an initial reset and a pulse pattern as an ID authentication pattern to the switching element.

6 Claims, 4 Drawing Sheets

NON-CONTACT POWER TRANSFER APPARATUS

BACKGROUND OF THE INVENTION

1. Field of the Invention

The present invention relates to a non-contact power transfer apparatus for a power reception unit to non-contact charge a secondary battery built in an electronic device such as a portable device.

2. Description of the Related Art

As illustrated in FIG. 1, a typical non-contact power transfer apparatus includes a power transmission unit main body 10 having a power transmission coil L1 for power transmission built therein, and a support base 20 formed as a part of the main body for mounting a power reception unit 30 detachably thereon, the power reception unit 30 having a power reception coil L2 for power reception built therein. It is not preferable for safety reasons that the power transmission unit 10 starts power transfer before it recognizes that the power reception unit 30 is mounted at a predetermined position on the support base 20. For example, as illustrated in FIG. 1, assume that a metal piece x such as a coin is close to the power transmission coil 1. If the power transmission unit 10 transfers power all the time, a metal piece x generates heat on the electromagnetic induction principle.

Then, the support base in the stationary power transmission unit is devised in shape and the power reception unit is mounted to be tilted. Then, a power transmission coil is arranged on a tilted part of the support base and a power reception coil is set on the back surface of the power reception unit to face the power transmission coil. With this structure, the metal piece is prevented from being close to the power transmission coil. A charge device for a portable device having such characteristics has been developed and disclosed in JP-A No. 2000-37047 (KOKAI).

In addition, JP-A No. 6-311658 (KOKAI) discloses means for preventing a metal piece from generating heat when the metal piece is placed close to the power transmission coil. The power transmission unit performs controlled or restrained power transfer (intermittent operation or the like) and supplies power to the power reception coil in the power reception unit. With this supply, the power reception unit outputs an authentication signal to the power transmission unit so that an authentication circuit identifies the authentication signal. When the authentication results in success, the power transmission unit starts transfer of normal charge power and the power is charged in the secondary battery or the like of the power reception unit.

The charge device for a portable device disclosed in JP-A No. 2000-37047 (KOKAI) is characterized only by the tilted power reception unit. Hence, when the metal piece is attached about to the power transmission coil, the metal piece generates heat dangerously. Besides, when the metal piece is placed on the power transmission unit, there may occur displacement of the power transmission coil from the power reception coil so that there arise problems that charge efficiency is deteriorated and charge time becomes longer. Further, as there are increasing restrictions in design of the power transmission unit and there arises a problem of difficult designing.

In addition, in the authentication method disclosed in JP-A No. 6-311658 (KOKAI), the metal piece is prevented from generating heat even when it is placed close to the power transmission coil. For this reason, the controlled power transfer (intermittent operation or the like) is performed all the time. Although the power is controlled (intermittent operation or the like), it can be said that power is always consumed wastefully. Besides, there also arises a problem that unnecessary electromagnetic waves are radiated in the air as long as the power is transferred.

SUMMARY OF THE INVENTION

The present invention has been made in view of the foregoing problems, and has an object to provide a non-contact power transfer apparatus which is safe, capable of reducing unnecessary power loss and preventing heat generation even when a foreign matter like a metal piece is placed close thereto.

The non-contact power transfer apparatus according to the present invention including a main body of a power transmission unit having a power transmission coil, a power reception unit having a power reception coil, and a support base formed at a part of the main body for mounting the power reception unit detachably, the non-contact power transfer apparatus performing non-contact power transfer from the power transmission coil to the power reception coil using electromagnetic induction, wherein the power transmission unit includes: a resonant capacitor connected in series to the power transmission coil; a power transmission circuit; a current detection circuit for detecting a direct current of an input power source side; unit detection means; and a first microcomputer having a control circuit for controlling the power transmission circuit, the current detection circuit and the unit detection means, and the power reception unit includes: a resonant capacitor connected in parallel with the power reception coil; a rectification smoothing circuit; a series regulator; a charge battery unit having a rechargeable battery; a switching element for pulse-charging; and a second microcomputer having a control circuit for controlling the series regulator and the switching element, and the second microcomputer and on/off switching of the switching element are used to generate a plurality of pulse patterns.

The first microcomputer and the second microcomputer have predetermined pulse patterns set in advance according to a state of load of the power reception unit (charge battery unit) and the power reception unit is monitored thereby perform power transfer according to the load appropriately.

Further, the power transmission unit has, as the unit detection means, any one of a proximity sensor, a magnetic detector, a photoreceptor, a photoelectric light emitting device and the like, and the power reception unit has any one of a light reflector, a permanent magnet and the like.

DETAILED DESCRIPTION OF THE INVENTION

According to the non-contact power transfer apparatus of the present invention, when a metal piece such a coin is attached to the support base of the power transmission unit main body, or when the power reception unit is not mounted on the support base properly, the unit detection means provided on the power transmission unit is used to prevent power transfer from the power transmission coil to the power reception coil.

In addition, even when the unit detection means recognizes that the power reception unit is mounted on the support base properly, if the pulse pattern set by the second microcomputer in power transfer in the initial operation is not recognized by the current detection circuit of the power transmission unit, the power transfer is not performed. This can eliminate the risk of heat generation by the metal piece. Then, the apparatus can be restarted after correcting displacement or the like.

Further, even when the power reception unit is mounted properly, if the power reception unit is not a specific one, or if the authentication pattern set in the first microcomputer is different from the authentication pattern set in the second microcomputer, the power transfer is not performed.

Figure 2:
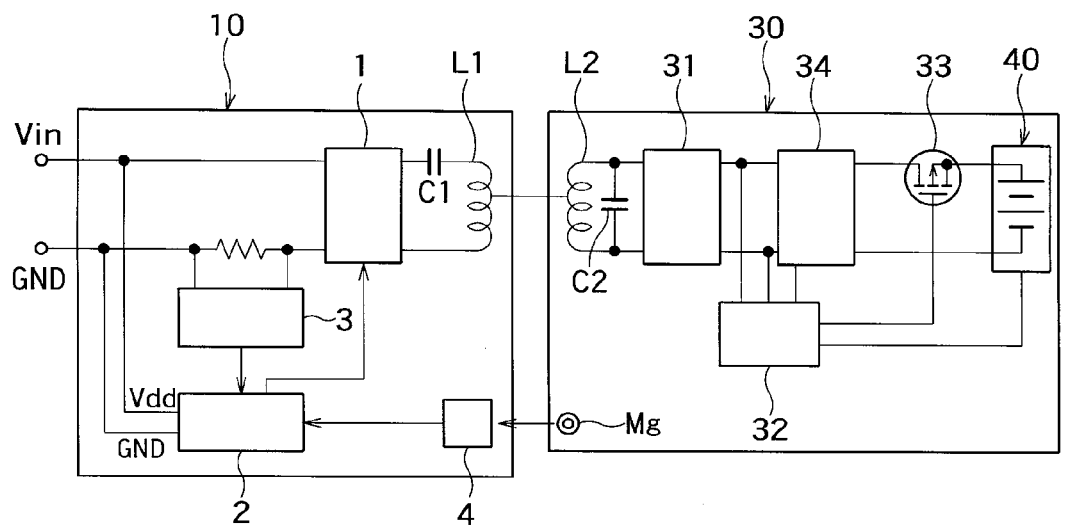
FIG. 2 is a block diagram illustrating one exemplary embodiment of a non-contact power transfer apparatus according to the present invention.
Figure 3:
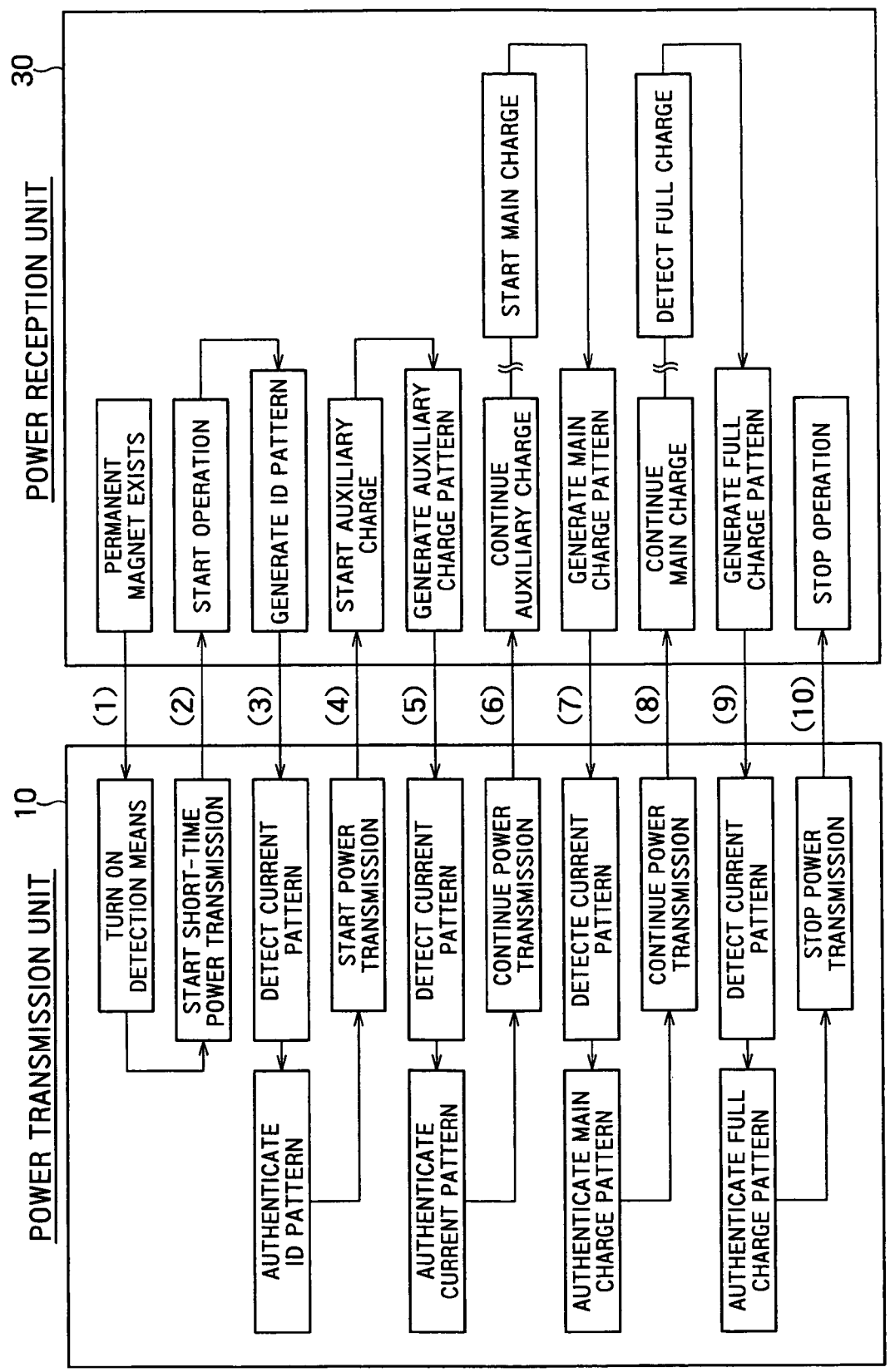
FIG. 3 is a flowchart illustrating operations of the non-contact power transfer apparatus according to the present invention.
Figure 4:
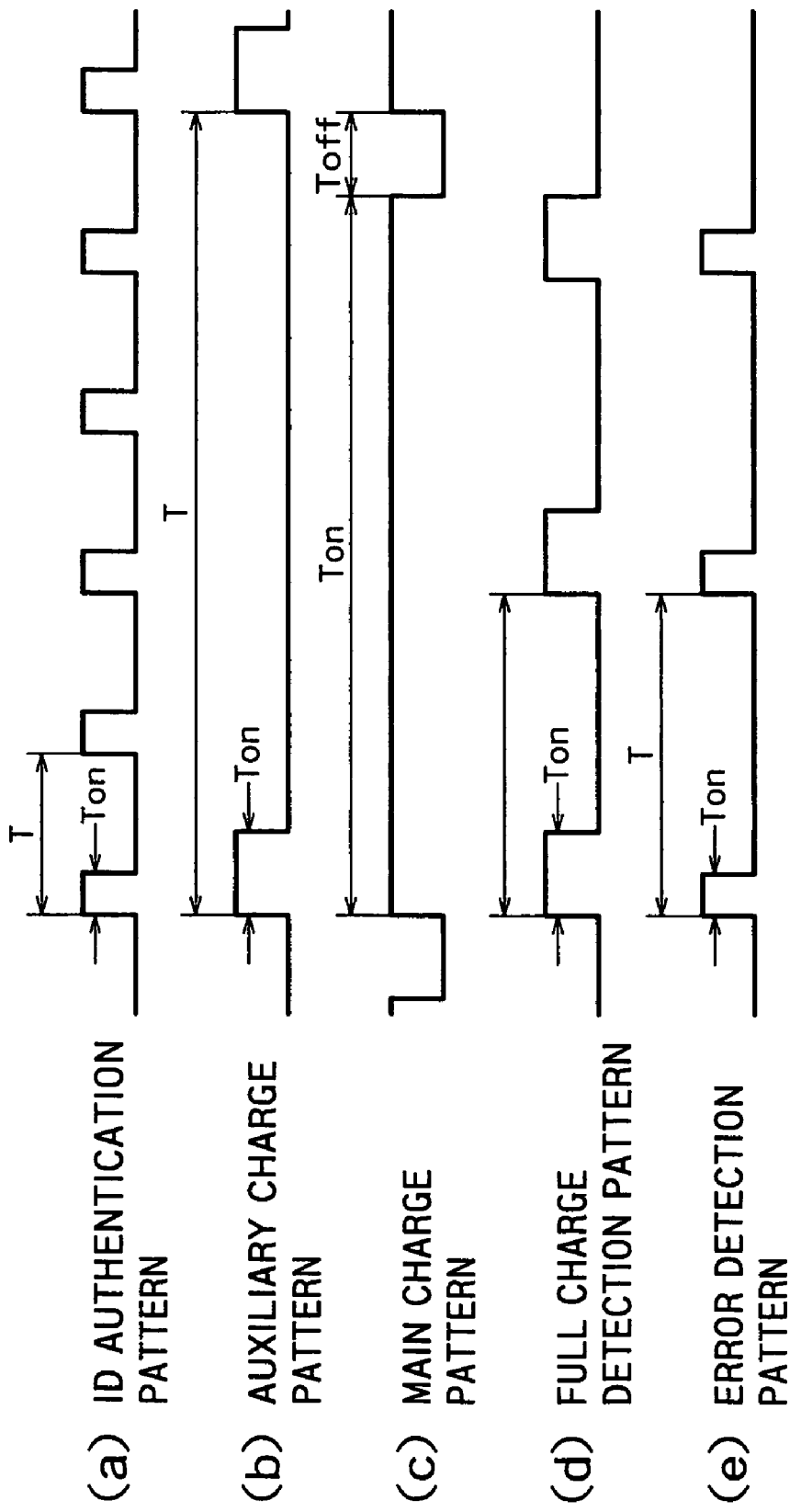
FIGS. 4(*a*) to 4(*e*) illustrate pulse patterns as one example of the non-contact power transfer apparatus according to the present invention.

FIGS. 2 to 4 are used to describe the non-contact power transfer apparatus of the present invention in detail.

FIG. 2 is a block diagram illustrating one exemplary embodiment of the non-contact power transfer apparatus having a power transmission unit and a power reception unit including a charge battery unit.

In FIG. 2, the power transmission unit 10 includes a power transmission circuit 1, a power transmission coil L1, a series resonant capacitor C1, a current detection circuit 3, a first microcomputer 2 and unit detection means 4.

Meanwhile, the power reception unit 30 includes a power reception coil L2, a parallel resonant capacitor C2, a rectification smoothing circuit 31, a series regulator 34, a switching element 33, a second microcomputer 32 and a permanent magnet Mg and also includes a charge battery unit 40.

The power transmission unit 10 is specifically described in detail.

The power transmission circuit 1 is connected in series to the series resonant capacitor C1 and the power transmission coil L1, and the current detecting resistance is connected to between an input side power source GND and the power transmission circuit 1, which are provided in the current detection circuit 3. The current detection circuit 3 detects a direct current according to a load (charge battery unit 40) of the power reception unit 30 seen from the power transmission unit 10. The unit detection means 4 detects a position, for example, by providing a permanent magnet at a part of a housing of the power reception unit 30 and providing a hole element in the facing power transmission unit 10. Then, when the unit detection means 4 detects the power reception unit 30 mounted on the support base, the first microcomputer 2 supplies power from the power transmission coil L1 via the power transmission circuit 1. Further, the current detection circuit 3 monitors the state of the load of the power reception unit 30 and controls the power supply of the power transmission circuit 1 according to the detected load pattern. Here, a display device such as an LED, lamp or the like and a driving circuit for driving the display device may be provided though they are not illustrated.

Next description is made about the power reception unit 30 specifically.

In the power reception unit 30, the power reception coil L2 receives power from the power transmission coil L1 of the power transmission unit 10 and the rectification smoothing circuit 31 converts it to a DC voltage. The series regulator 34 generates a stabilized predetermined voltage from the DC voltage obtained from the rectification smoothing circuit 31. The switching element 33 connected to the series regulator 34 is switched ON/OFF at given intervals and the charge battery unit 40 is pulse-charged. The second microcomputer 32 controls the series regulator 34. It also obtains information from the charge battery unit 40 and supplies the switching element 33 with a preset given pulse pattern to perform pulse-charging of the charge battery unit 40. In this example, the series regulator 34 is used; however, a step-down converter may be used instead.

In this structure, the first microcomputer 2 of the power transmission unit 10 and the second microcomputer 32 of the power reception unit 30 have preset given pattern data stored therein. Pattern includes an authentication pattern, an auxiliary charge pattern, a main charge pattern, a full charge pattern, an error detection pattern and the like. Any recent microcomputer can perform these operations (controls) at low power consumption and can be equipped with additional functions easily.

With reference to the block diagram of FIG. 2 and the flowchart of FIG. 3, the operation example of the non-contact power transfer apparatus according to the present invention is described. The numbers in the parentheses denote steps in the flowchart of FIG. 3.

First, an input power source Vin is applied to the power transmission unit 10.

Figure 1:
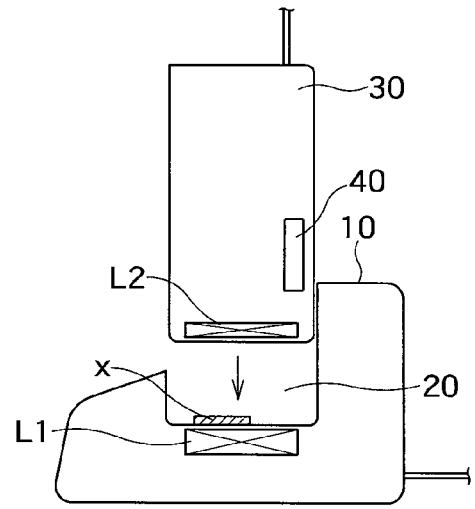
FIG. 1 is a structural view of a power reception unit and a power transmission unit of a non-contact power transfer apparatus.

(1) When the power reception unit 30 is properly mounted on the support base 20 (see FIG. 1) formed on the main body of the power transmission unit 10, the permanent magnet Mg of the power reception unit 30 comes close to the unit detection means 4 of the power transmission unit 10 (hole element in the example). Then, a signal is sent from the unit detection means 4 to the first microcomputer 2 and the first microcomputer 2 operates the power transmission circuit 1 to transfer power via the power transmission coil L1 for a preset short time (for example, 200 msec).

(2) The power reception unit 30 receives power via the power reception coil L2, and the rectification smoothing circuit 31 and series regulator 34 are used to generate a set voltage. At the same time, the set voltage is used to start the second microcomputer 32 to apply an initial reset and a pulse pattern as an ID authentication pattern (pattern of FIG. 4(a)) to the switching element 33. Thus, the pulse charge to the charge battery unit 40 is started.

(3) Simultaneously, this pulse pattern (ID authentication pattern) is sent from the power reception coil L2 to the power transmission coil L1 and detected via the current detection circuit 3 of the power transmission unit 10. This pattern becomes the ID authentication pattern and is compared with an ID authentication pattern stored in the first microcomputer 2 by itself. When the ID patterns are in agreement, the first microcomputer 2 sends the power transmission circuit 1 a power transfer start command and the power transmission circuit 1 starts power transfer to the reception unit 30 via the power transmission coil L1.

(4) Then, the power started to be transferred is used to start auxiliary pulse charge by switching on/off of the switching element 33 according to the pulse pattern (pattern of FIG. 4(b)) for starting auxiliary charge at the second microcomputer 32 of the power reception unit 30.

(5) When this pulse pattern is sent via the power reception coil L2 to the power transmission coil L1 of the power transmission unit 10 and the pulse pattern as auxiliary charge pattern is detected by the current detection circuit 3, the pulse pattern is compared with a normal pulse pattern stored in the first microcomputer 2. When the comparison results in good agreement, power transfer is continued from the power transmission circuit 1 via the power transmission coil L1.

(6) As the power transfer continues, the power reception unit 30 continues auxiliary charge. Then, the second microcomputer 32 receives, from the charge battery unit 40, feedback information for transition from auxiliary charge to main charge. After reception of the information, the second microcomputer 32 operates the switching element 33 with a preset pulse pattern for a main charge pattern (pattern of FIG. 4(c)) and starts main charge.

(7) At the power transmission unit 10, the pulse pattern for transition to the main charge is detected by the current detection circuit 3 and is compared with the normal main charge pattern stored in the first microcomputer 2 by itself. When the comparison results in good agreement, a command from the first microcomputer 2 is sent and power transfer is continued from the power transmission circuit 1 via the power transmission coil L1.

(8) When the main charge continues and, in the charge battery unit 40, full charge information is fed back to the second microcomputer 32 of the power reception unit 30, the second microcomputer 32 applies a preset pulse pattern for full charge (pattern of FIG. 4(d)) to the switching element 33.

(9) Meanwhile, in the power transmission unit 10, when the full charge pulse pattern is detected by the current detection circuit 3, it is compared with the pulse pattern set in the first microcomputer 2 by itself. When the comparison results in good agreement, the operation of the power transmission circuit 1 is stopped.

(10) At the same time, when the power transfer is stopped, power is not generated at the power reception coil L2 and the operation of the power reception unit 30 is stopped.

Thus, it is configured to monitor the normal operation by comparing the pulse patterns of the first microcomputer 2 of the power transmission unit 10 and the second microcomputer 32 of the power reception unit 30 for authentication. Besides, the pulse pattern is used to perform pulse charge of the charge battery unit 40 and the states of the charge battery unit 40 and the power reception unit 30 are monitored with the pulse pattern by the current detection circuit 3 via the power reception coil L2 and the power transmission coil L1. With this structure, the power reception unit 30 can be maintained safe. The power reception unit 30 is a general charge circuit and operates by use of the second microcomputer 32 with a pulse pattern which is so small as not to affect the charge operation of the charge battery unit 40. Hence, if there is no power (or power is lacked) in the power reception unit 30, it has only to be mounted on the power transmission unit 10 thereby to be able to charge a rechargeable battery of the charge battery unit 40 safely.

Next, the example of various pulse patterns used in the above description is illustrated in FIGS. 4(a) to 4(e). These pulse patterns are no more than examples and not intended for limiting the invention.

FIG. 4(a) illustrates an ID authentication pattern.
FIG. 4(b) illustrates an auxiliary charge pattern.
FIG. 4(c) illustrates a main charge pattern.
FIG. 4(d) illustrates a full charge pattern (charge is finished).
FIG. 4(e) illustrates an error detection pattern.

The detecting method of the current detection circuit in the above-described operation is now described in detail with reference to FIGS. 5(a) to 5(e) and FIG. 6.

Figure 5:
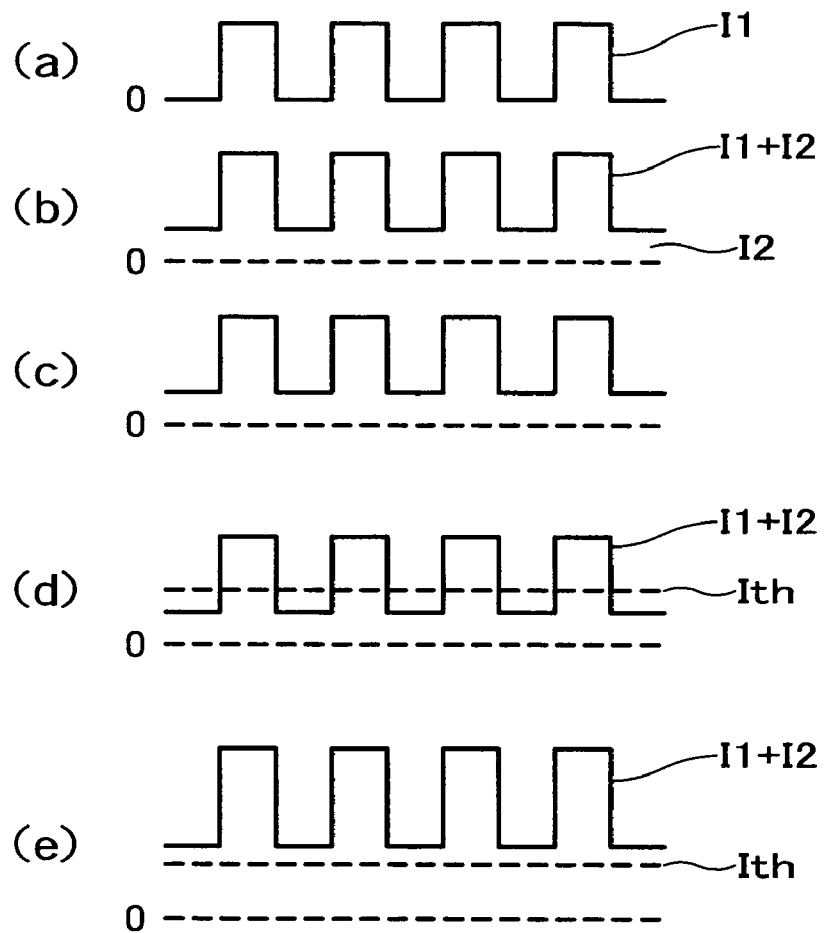
FIGS. 5(*a*) to 5(*e*) are views of detected current waveforms illustrating an operation example of non-contact power transfer apparatus according to the present invention.

FIG. 5(a) illustrates a current waveform I1 of current pulse-charged in the rechargeable battery of the charge battery unit 40.

FIG. 5(b) illustrates a composite current waveform I1+I2 from the current I1 pulse-charged in the rechargeable battery and the current I2 consumed all the time by the second microcomputer of the power reception unit 30 and the like.

FIG. 5(c) illustrates a current waveform detected by the current detection circuit 3 of the power transmission unit 10.

FIG. 5(d) illustrates a current waveform of the current detected by the current detection circuit 3 of the power transmission unit 10 of FIG. 5(c), the current waveform being corrected by a threshold current Ith. With this correction, the current waveform can be similar to the waveform illustrated in FIG. 5(a). The threshold current Ith is slightly larger than a current containing the current I2 consumed all the time by the second microcomputer and the like (current when power is not given to the charge battery unit 40).

FIG. 5(e) illustrates a current waveform detected by the current detection circuit 3 when a foreign matter of metal is attached to between the power transmission unit 10 and the power reception unit 30 or when the coils of the power transmission unit 10 and the power reception unit 30 facing each other are displaced from respective predetermined positions. In such a case, the consumed current I2 becomes larger than the threshold current Ith and the detected current waveform does not become a normal pulse waveform. This state is judged as an abnormal event and the first microcomputer 2 is used to stop the power transmission circuit.

In this way, the current waveform consumed by the power reception unit 30 becomes almost the same as the current waveform of current change that affects the input current of the input power source via the power reception coil L2 and the power transmission coil L1. Hence, the load state of the power reception unit 30 can be monitored by detecting and monitoring the input current.

Figure 6:
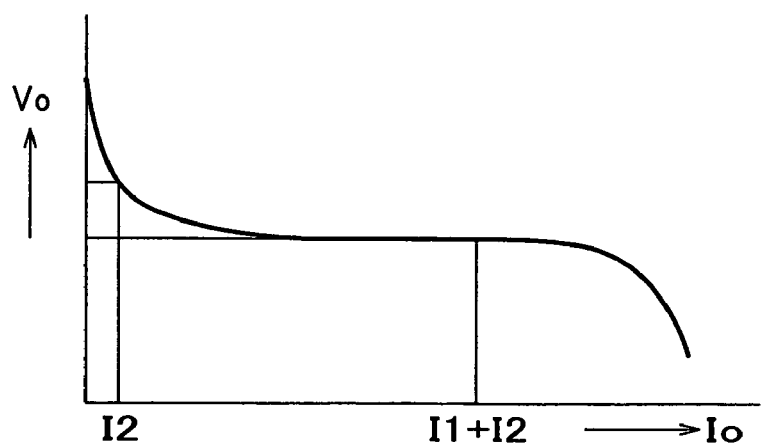
FIG. 6 is a load curve of the non-contact power transfer apparatus.

In the load curve in non-contact power transmission illustrated in FIG. 6, feedback is not performed. Therefore, a voltage Vo tends to increase during light load. However, in the charge state, the composite current I1+I2 from the charged current I1 and the current I2 flows, and hence, the voltage Vo is stabilized.

As described above, when a foreign matter of metal is attached between the power transmission unit 10 and the power reception unit 30, the distance between the power transmission coil L1 and the power reception coil L2 becomes longer and eddy current due to the metal increases. For this reason, as illustrated in FIG. 5(e), a consumed current I2 of the whole power reception unit 30 seems to be increased.

Further, when a flat air-core coil is used as each of the power transmission coil L1 and the power reception coil L2, a magnetic sheet equal in size to the air-core coil is prepared and attached to each of surfaces opposite to the air-core coil surfaces facing each other. This makes it possible to easily detect displacement between the power transmission coil L1 and the power reception coil L2 and change in the distance therebetween. In other words, when the displacement or distance between the power transmission coil L1 and the power reception coil L2 is larger, the coupling coefficient becomes smaller and an inductance decreases. Hence, more current tends to flow. This brings improvement of detection by using the magnetic sheet of higher relative magnetic permeability μ.

As described above, according to the present invention, when a metal piece such as a coin is attached to the support base of the power transmission unit main body, or when the power reception unit is not mounted on the support base properly, the unit detection means provided in the power transmission unit is not allowed to supply power from the power transmission coil to the power reception coil. This enables to prevent the risk of heat generation. Besides, if the mounted power reception unit is not a specified power reception unit, certifying means is used to prevent power supply. Further, it can be restarted by correcting the error operation even due to slight displacement. Thus, in the unit detection means, power required for driving of magnetic field detecting element, a proximity sensor and the like is so small that it is economical and the power of the power reception unit is not consumed. Further, even when the rechargeable battery is completely discharged, position detection is possible and there is no need to consider heat generation or the like. Furthermore, as the minute and light permanent magnet, reflector or the like is used in the power reception unit, the power reception unit can be weight reduced.

Further, although the magnetic field detecting element and the permanent magnet are used in the above-described example, an optical sensor utilizing a proximity sensor or light reflection, combination of a photo transistor and infrared LED or the like may be used. Furthermore, the power transmission circuit may be a full bridge circuit, a half bridge circuit, or any other power transmission circuit.

What is claimed is:

1. A non-contact power transfer apparatus comprising: a main body of a power transmission unit having a power transmission coil; a power reception unit having a power reception coil; and a support base formed at a part of the main body for mounting the power reception unit detachably, the non-contact power transfer apparatus performing non-contact power transfer from the power transmission coil to the power reception coil using electromagnetic induction, wherein
   the power transmission unit includes:
   a resonant capacitor connected in series to the power transmission coil;
   a power transmission circuit for supplying power to the power transmission coil via the resonant capacitor;
   a current detection circuit for detecting a direct current of an input power source of the power transmission circuit;
   unit detection means for detecting a mounting of the power reception unit on the support base; and
   a first microcomputer having a control circuit for controlling the power transmission circuit, the current detection circuit and the unit detection means, and
   the power reception unit includes:
   a resonant capacitor connected in parallel with the power reception coil;
   a rectification smoothing circuit for rectifying and smoothing power transferred to the power reception coil;
   a series regulator for converting an output from the rectification smoothing circuit to a predetermined stabilized voltage;
   a charge battery unit having a rechargeable battery;
   a switching element connected in series to the charge battery unit for pulsing an output from the series regulator and pulse-charging the charge battery unit; and
   a second microcomputer having a control circuit for controlling the series regulator and the switching element, and
   the second microcomputer and on/off switching of the switching element are used to generate a plurality of pulse patterns.

2. The non-contact power transfer apparatus according to claim 1, wherein when the unit detection means detects that the power reception unit mounted on the support base, the first microcomputer operates the power transmission circuit to transfer power from the power transmission coil, recognizes change in the direct current detected in the current detection circuit, compares it with a preset given pattern and controls the power transmission circuit.

3. The non-contact power transfer apparatus according to claim 1, wherein the second microcomputer operates to pulse-charge in the charge battery unit with a dc voltage obtained from the power received by the power reception coil via the rectification smoothing circuit and the series regulator by switching on/off of the switching element at a predetermined pattern.

4. The non-contact power transfer apparatus according to claim 1, wherein the first microcomputer and the second microcomputer have preset ID authentication pattern, auxiliary charge pattern, main charge pattern, full charge pattern and error detection pattern.

5. The non-contact power transfer apparatus according to claim 1, wherein the unit detection means of the power transmission unit has any one of a proximity sensor, a magnetic detector, a photoreceptor or a photoelectric light emitting device, and the power reception unit has any one of a light reflector or a permanent magnet.

6. The non-contact power transfer apparatus according to claim 1, wherein the power transmission coil and the power reception coil have each of magnetic sheets on surfaces opposite to surfaces facing flat air-core coils.

* * * * *